June 13, 1939.  F. H. DREYER  2,162,067
WHEEL BANKING DEVICE
Filed March 12, 1938
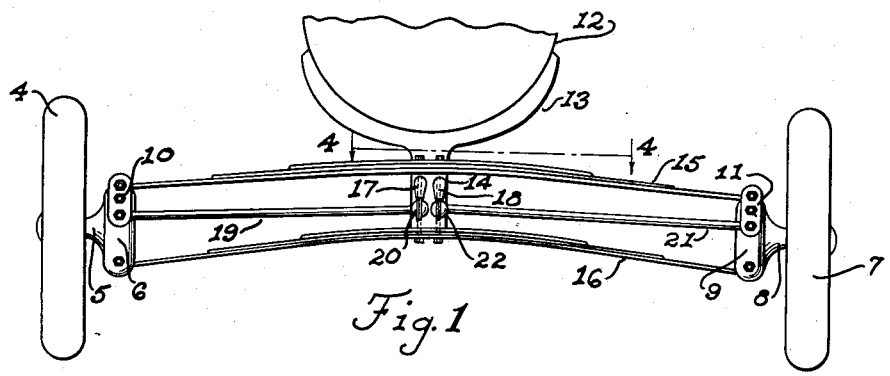
Fig. 1
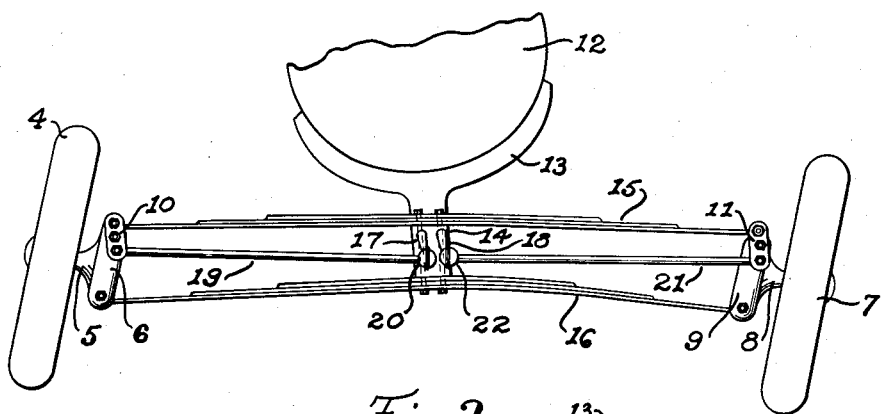
Fig. 2
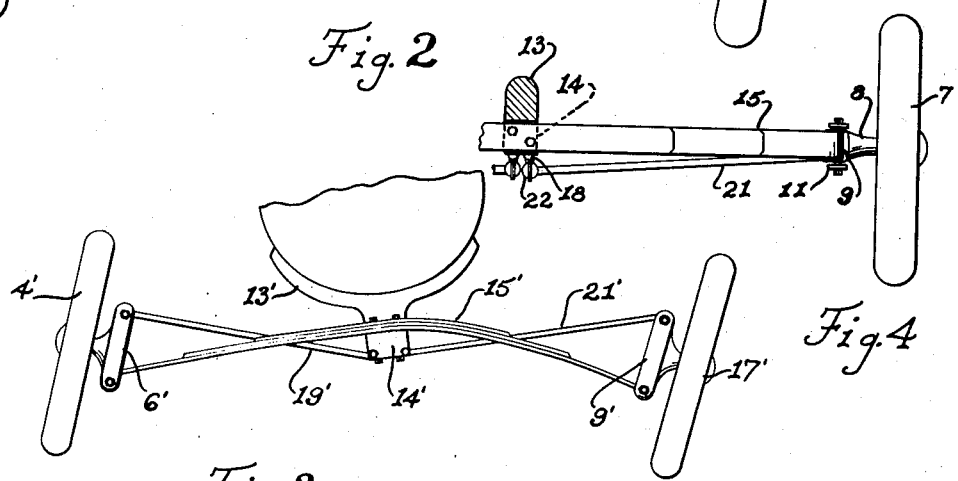
Fig. 3
Fig. 4
Inventor
Floyd H. Dreyer
By
Minturn & Minturn
Attorneys Patented June 13, 1939

2,162,067

UNITED STATES PATENT OFFICE 2,162,067

WHEEL BANKING DEVICE

Floyd H. Dreyer, Indianapolis, Ind.

Application March 12, 1938, Serial No. 195,459

3 Claims. (Cl. 280—112)

This invention relates to improvements for banking the wheels of motor cars, that is, sloping them in opposition to the action of centrifugal force in traveling around curves to counteract the tendency of the car to be thrown centrifugally off of the track at such places.

Another object is to cause the wheels to be banked automatically and properly by a tilting of the frame and body of the car as caused by the natural lean or change from a vertical position of the bodies of the occupants while rapidly rounding a curve.

The object also is to enable the ground wheels to move individually in a vertical plane in passing over localized bumps in the road without transmitting a corresponding movement to the wheel of the pair on the other side of the car, and the object is to rectify the movement of the wheels as well as to tilt them.

I accomplish the above and other objects which will hereinafter appear, by the mechanism illustrated in the accompanying drawing, in which Fig. 1 is a view in elevation of the end of the frame and fragment of the body of a car mounted on a pair of wheels and equipped with my invention, as the parts appear running straight ahead;

Fig. 2 is an elevation of the same parts in their changed positions assumed for banking, and Fig. 3 is a view, similar to Fig. 2, of a modified form of my invention, and Fig. 4 is a fragment in top plan and section on the line 4—4 of Fig. 1.

Like characters of reference indicate like parts in the several views of the drawing.

My invention may be applied to the front wheels, rear wheels, or both, and in the following description and claims shall be so considered, without further statement to that effect.

A ground wheel 4 is mounted on an axle 5. The inner end of the axle is formed with an extension 6, extending above and below the axle. In like manner the ground wheel 7 is mounted on an axle 8 having an extension 9 on its inner end extending above and below the axle. A lever 10 is pivoted at its middle to the upper end of extension 6 and a like lever 11 is similarly pivoted to the upper end of extension 9.

The car body 12 is mounted on a yoke 13 which is a part of the frame of the car.

The yoke 13 has a block extension 14, here shown as cast as an integral part of the yoke. It has a top bearing surface upon which a leaf spring 15 is laid and bolted.

The block 14 rests upon and is supported by a leaf spring 16. The block is bolted to the spring 16. The respective ends of the spring 15 are pivotally attached to the upper ends of the levers 10 and 11, and the respective ends of the spring 16 are pivotally attached to the lower ends of the extensions 6 and 9.

Fixed rigidly to the block 14 are cranks 17 and 18, each of which terminates with a ball.

Pivotally attached to the lower end of the lever 10 is a rod 19, having a socket 20 on its inner end which receives the ball on the end of the crank 17.

Pivotally attached to the lower end of lever 11 is a rod 21, having a socket 22 on its inner end which receives the ball on the end of the crank 18.

The spring 15 approaches a straight condition in banking which holds the upper ends of the levers 10 and 11 relatively immovable and in like manner the spring 16 holds the lower ends of the hub extensions 6 and 9 relatively immovable but the link 19, in the banking position of Fig. 2 pulls on the lower end of lever 10 and the rod 21 pushes at the same time on the lower end of lever 11 by reason of their jointed connection with cranks 18 and 19. This tilts the axle extensions 6 and 9 in the direction to tilt or bank the wheels 4 and 7.

The connection between the cranks on the block 14 and the lower ends of levers 10 and 11 is by two rods 19 and 21 in order to enable a ground wheel on either side to ride over a bump local to that wheel by a vertical travel of the wheel without transmitting the disturbed movement to the wheel on the other side of the car.

In the modification shown in Fig. 3 a leaf spring 15' is bolted to the top of the block 14' of yoke 13' and the ends of the spring are pivoted to the lower ends of the axle extensions 6' and 9', and a rod 19' is pivoted to the upper end of extension 6' at one end and to the lower end of block 14' at the other. The block 14' is connected with the upper end of extension 9' by a rod 21'. The two wheels 4' and 7' are banked as shown in Fig. 3, but there is no vertical travel afforded to the individual wheels as in the device of Figs. 1 and 2.

Changes may be made in the details of construction without departing from the scope of my invention and I, therefore, do not desire to be limited to the exact form shown and described except as set forth in the appended claims.

I claim:

1. In a wheel banking device, a pair of spread-apart axles each having an upper and a lower vertical extension on their inner ends, a frame-yoke having a block, a leaf spring attached at each end to the lower extensions of the axles and at its middle to the block, a lever for each axle pivoted at its middle to the upper extension of the axle, a leaf spring connected at its ends with the upper ends of the two levers and at its middle with the upper part of the block, and rod connections between the lower part of the block and the lower ends of the two levers.

2. In a wheel banking device, a pair of spread-apart axles each having an upper and a lower vertical extension on their inner ends, a frame-yoke having a block, a leaf spring attached at each end to the lower extensions of the axles and at its middle to the block, a lever for each axle pivoted at its middle to the upper extension of the axle, a leaf spring connected at its ends with the upper ends of the two levers and at its middle with the upper part of the block and a pair of rods both connected with the lower part of the block and each with a lower end of respective ones of the levers.

3. In a wheel banking device, a pair of spread-apart axles each having an upper and a lower vertical extension on their inner ends, a frame-yoke having a block, a leaf spring attached at each end to the lower extensions of the axles and at its middle to the bottom of the block, a lever for each axle pivoted at its middle to the upper extensions of the axle, a leaf spring connected at its ends with the upper ends of the two levers and at its middle with the upper part of the block, and a pair of rods one of which is pivotally connected with the block at one end and with the lower end of a lever at the other end and a second rod pivotally connected with th block at one end and with the lower end of the other lever.

FLOYD H. DREYER.